United States Patent
Higgins et al.

(10) Patent No.: US 11,038,450 B2
(45) Date of Patent: Jun. 15, 2021

(54) SYSTEMS AND METHODS FOR PREDICTING THE HEALTH OF INTEGRATED DRIVE GENERATORS

(71) Applicant: Hamilton Sundstrand Corporation, Charlotte, NC (US)

(72) Inventors: Angela Higgins, Windsor, CT (US); Mykola Kravchenko, Madison, WI (US); Shashvat Prakash, South Windsor, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 16/425,827

(22) Filed: May 29, 2019

(65) Prior Publication Data
US 2020/0382031 A1    Dec. 3, 2020

(51) Int. Cl.
*H02P 9/42* (2006.01)
*H02P 101/25* (2016.01)
(Continued)

(52) U.S. Cl.
CPC ................. *H02P 9/42* (2013.01); *B64F 5/40* (2017.01); *B64F 5/60* (2017.01); *H02P 2101/25* (2015.01); *H02P 2101/30* (2015.01)

(58) Field of Classification Search
CPC .... H02P 9/42; H02P 2101/00; H02P 2101/25; H02P 2101/30
See application file for complete search history.

(56) References Cited

U.S. PATENT DOCUMENTS

| 4,510,433 A | * | 4/1985 | Gamze | ...................... H02P 9/42 322/32 |
| 5,729,118 A | * | 3/1998 | Yanagisawa | ............ H02P 9/007 322/29 |

(Continued)

FOREIGN PATENT DOCUMENTS

| CN | 1553209 A | 12/2004 |
| EP | 1106870 A2 | 6/2001 |
| WO | 2016/196775 A1 | 12/2016 |

OTHER PUBLICATIONS

Extended European search report issued in corresponding EP application No. 19212331.3, dated Jun. 29, 2020.
(Continued)

*Primary Examiner* — Sean Gugger
(74) *Attorney, Agent, or Firm* — Locke Lord LLP; Scott D. Wofsy; Alicia J. Carroll (57) ABSTRACT

A method of predicting a health status of an integrated drive generator (IDG) includes determining an effective deviation across a plurality of IDG output frequencies for a given IDG operation period. The method includes correlating the effective deviation to an IDG capability to determine a health of the IDG. A system for predicting a health status of an integrated drive generator (IDG) includes an IDG and a generator control unit (GCU) operatively connected to the IDG to determine a plurality of IDG output frequencies for a given IDG operation period. The system includes a central processing unit (CPU) operatively connected to the GCU to receive the IDG output frequencies therefrom. The CPU is configured and adapted to determine an effective deviation across at least some of the plurality of IDG output frequencies for the given IDG operation period, and correlate the effective deviation to an IDG capability to determine a health of the IDG.

17 Claims, 6 Drawing Sheets

(51) Int. Cl.
*H02P 101/30* (2015.01)
*B64F 5/60* (2017.01)
*B64F 5/40* (2017.01)

(56) References Cited

U.S. PATENT DOCUMENTS

| | | | |
|---|---|---|---|
| 6,434,512 B1* | 8/2002 | Discenzo | F16C 19/52 |
| | | | 702/184 |
| 7,684,936 B2* | 3/2010 | Bechhoefer | G05B 23/0283 |
| | | | 701/31.4 |
| 7,979,220 B2 | 7/2011 | Scholtz et al. | |
| 9,989,138 B2 | 6/2018 | Grosskopf et al. | |
| 10,344,740 B2* | 7/2019 | Caponetti | F03G 7/00 |
| 10,400,751 B2* | 9/2019 | Schafer | F03D 7/0284 |
| 2009/0180875 A1* | 7/2009 | Egedal | F03D 17/00 |
| | | | 416/43 |
| 2010/0049455 A1* | 2/2010 | Scholtz | H02P 9/105 |
| | | | 702/60 |
| 2010/0148507 A1* | 6/2010 | Lim | F03D 7/042 |
| | | | 290/44 |
| 2010/0298995 A1* | 11/2010 | Zhang | F03D 17/00 |
| | | | 700/287 |
| 2011/0125419 A1* | 5/2011 | Bechhoefer | F03D 17/00 |
| | | | 702/34 |
| 2013/0184884 A1* | 7/2013 | More | H02J 3/14 |
| | | | 700/291 |
| 2013/0288840 A1* | 10/2013 | Grosskopf | H02K 7/10 |
| | | | 475/84 |
| 2015/0308285 A1* | 10/2015 | Falb | F01D 15/10 |
| | | | 73/112.01 |
| 2015/0330365 A1* | 11/2015 | Deb | F03D 7/048 |
| | | | 700/287 |
| 2016/0033580 A1 | 2/2016 | Qiao et al. | |
| 2019/0140454 A1* | 5/2019 | Chase | H02P 9/04 |
| 2019/0305705 A1* | 10/2019 | Bennauer | H02P 9/42 |
| 2020/0052628 A1* | 2/2020 | Busker | H02P 9/42 |
| 2020/0144946 A1* | 5/2020 | Huang | H02P 9/105 |

OTHER PUBLICATIONS

Batzel T D et al: "Prognostic Health Management of Aircraft Power Generators", IEEE Transactions on Aerospace and Electronic Systems, IEEE Service Center, Piscataway, NJ, US, vol. 45, No. 2, Apr. 1, 2009 (Apr. 1, 2009), pp. 473-482, XP011262846.

Brian Keith Bailey:"Fault Diagnosis Via Univariate Frequency Analysis Monitoring: A Novel Technique Applied to a Simulated Integrated Drive Generator",May 31, 2012 (May 31, 2012), XP055706551, Retrieved from the Internet: URL: https://trace.tennessee.edu/cgi/viewco.

\* cited by examiner

Fig. 7

SYSTEMS AND METHODS FOR PREDICTING THE HEALTH OF INTEGRATED DRIVE GENERATORS

BACKGROUND OF THE INVENTION

1. Field of the Invention

Embodiments of the invention relate to integrated drive generators and more particularly to health monitoring and prediction for integrated drive generators.

2. Description of Related Art

The integrated drive generator (IDG) converts varying engine input speed into a constant output speed (frequency) for aircraft power. IDGs experience maximum output frequency modulation when the engine is operating at "straight through speed." Straight-through speed is the input speed range when the IDG neither increases nor decreases the IDG input speed in order to achieve an ideal IDG output frequency. Transitions from static to dynamic friction and low frequency torque variations at and near this speed amplifies any control deficiencies, which manifests as frequency modulation. When the output frequency modulation is outside of a desired range it can cause electrical anomalies that may prompt maintenance actions, sometimes which are outside of the designated maintenance schedule.

Such conventional methods and systems have generally been considered satisfactory for their intended purpose. However, there is still a need in the art for improved systems and methods for determining the health of an IDG. There is also a need for such systems that are easy to make and use. The present disclosure provides a solution for these needs.

SUMMARY OF THE INVENTION

A method of predicting a health status of an integrated drive generator (IDG) includes determining an effective deviation across a plurality of IDG output frequencies for a given IDG operation period. The method includes correlating the effective deviation to an IDG capability to determine a health of the IDG.

In some embodiments, the IDG capability is a near-term remaining useful life (RUL) prediction. The method can include outputting a health assessment if the near-term RUL prediction is equal to or less than a threshold. The threshold can include at least one warning threshold. Outputting the health assessment can include outputting at least one warning if the near-term RUL prediction is equal to or less than at least one warning threshold. The warning threshold can include a series of multiple warning thresholds. The method can include outputting at least one of a series of warnings if the near-term RUL is equal to or less than one or more of the series of warning thresholds. Outputting at least one of the series of warnings can include scheduling an IDG maintenance action. The IDG maintenance action can include at least one of repair, replacement, or stocking parts for at least one of repair or replacement.

The method can include adding the effective deviation to a historical database for an IDG. Determining the effective deviation can include determining a modified mean output frequency for the given IDG operation period across a plurality of select output frequencies of the plurality of output frequencies. The select output frequencies can be outside of a tolerance about a straight-through speed of the IDG. Determining the effective deviation can include isolating the IDG output frequencies when a respective IDG speed is within a tolerance about a straight-through speed of the IDG to generate a plurality of isolated output frequencies. Determining the effective deviation can include determining a modified mean output frequency for the given IDG operation period across a plurality of select output frequencies of the plurality of output frequencies. Determining the effective deviation can include determining a delta frequency for each isolated output frequency. The delta isolated output frequency can be a difference between a given one of the isolated output frequencies and the modified mean output frequency. Determining the effective deviation can include determining an effective standard deviation by generating a root mean squared (RMS) value for the delta frequencies. Determining the effective deviation can include determining an effective statistical percentile deviation and determining a modified mean output frequency for the given IDG operation period across a plurality of select output frequencies of the plurality of output frequencies. The effective statistical percentile deviation can include the difference between one of the isolated frequencies at a given percentile and the modified mean output frequency.

In accordance with another aspect, a system for predicting a health status of an integrated drive generator (IDG) includes an IDG, a generator control unit (GCU) operatively connected to the IDG to determine a plurality of IDG output frequencies for a given IDG operation period, and a central processing unit (CPU) operatively connected to the GCU to receive the IDG output frequencies therefrom. The CPU is configured and adapted to determine an effective deviation across at least some of the plurality of IDG output frequencies for the given IDG operation period, and correlate the effective deviation to an IDG capability to determine a health of the IDG.

In some embodiments, the IDG capability is a near-term RUL prediction. The system can include a historical database configured and adapted to store the effective deviation. The CPU can include an input configured and adapted to receive engine speed data. The CPU can include an output configured and adapted to send a near-term RUL prediction as a health assessment output, e.g. a warning, and trigger a maintenance action. The maintenance action can include at least one of repair, replacement, or stocking parts for at least one of repair or replacement.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
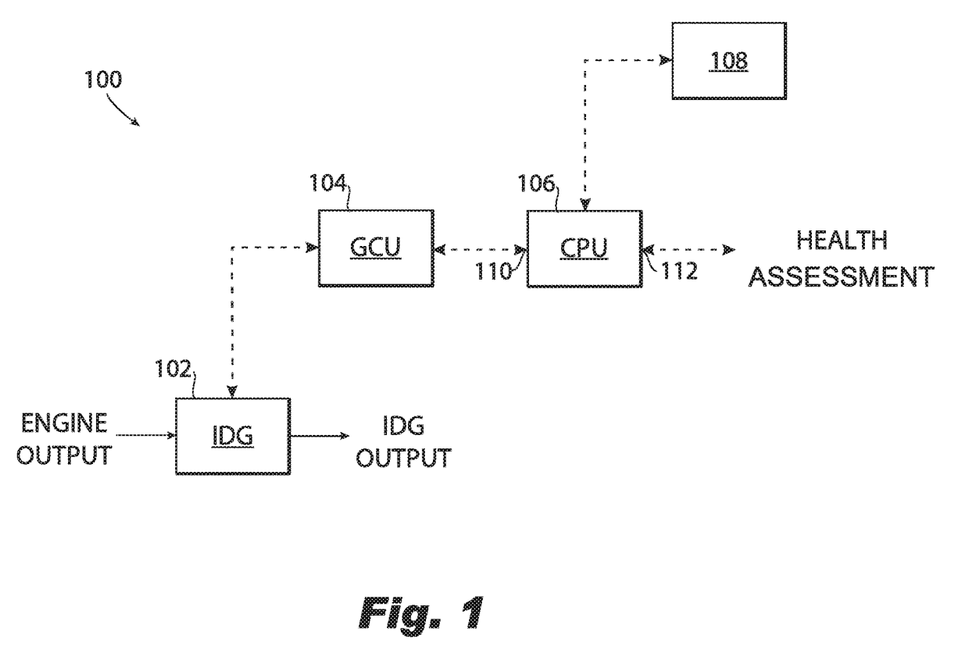
FIG. 1 is a schematic depiction of system for predicting a health status of an integrated drive generator (IDG) constructed in accordance with an embodiment of the present disclosure, showing the IDG and a generator control unit.

Reference will now be made to the drawings wherein like reference numerals identify similar structural features or aspects of the subject disclosure. For purposes of explanation and illustration, and not limitation, an embodiment of a system for predicting a health status of an integrated drive generator (IDG) in accordance with the disclosure is shown in FIG. 1 and is designated generally by reference character 100. Other embodiments of systems in accordance with the disclosure, or aspects thereof, are provided in FIGS. 2-7, as will be described.

As shown in FIG. 1, system 100 for predicting a health status of an integrated drive generator (IDG) 102 includes the IDG 102 and a generator control unit (GCU) 104 operatively connected to the IDG 102 to determine a plurality of IDG output frequencies for a given IDG operation period. System 100 includes a central processing unit (CPU) 106 operatively connected to the GCU 104 to receive the IDG output frequencies therefrom. The CPU 106 is configured and adapted to determine an effective deviation across at least one of the plurality of IDG output frequencies for the given IDG operation period, apply a linear regression equation taking into account historical effective deviation calculations to generate an effective deviation trend and correlate the effective deviation trend to an IDG capability, e.g. a near-term remaining useful life (RUL) prediction, of the IDG 102, such as how many operation periods (e.g. flights) until degradation occurs, whether it is degraded, close to being degraded, or the like. The RUL prediction can mean the time (flight time or the like) until the next expected service. Determining the near-term RUL prediction of the IDG is representative of the health of the IDG. The CPU can compare the near-term RUL prediction to at least one threshold, e.g. a warning threshold or an alert threshold, as described in more detail below. The CPU can compare the RUL prediction at least one of a series of thresholds and issue at least one health assessment that includes at least one of a series of warnings with increasing severity based on the given threshold.

Figure 4:
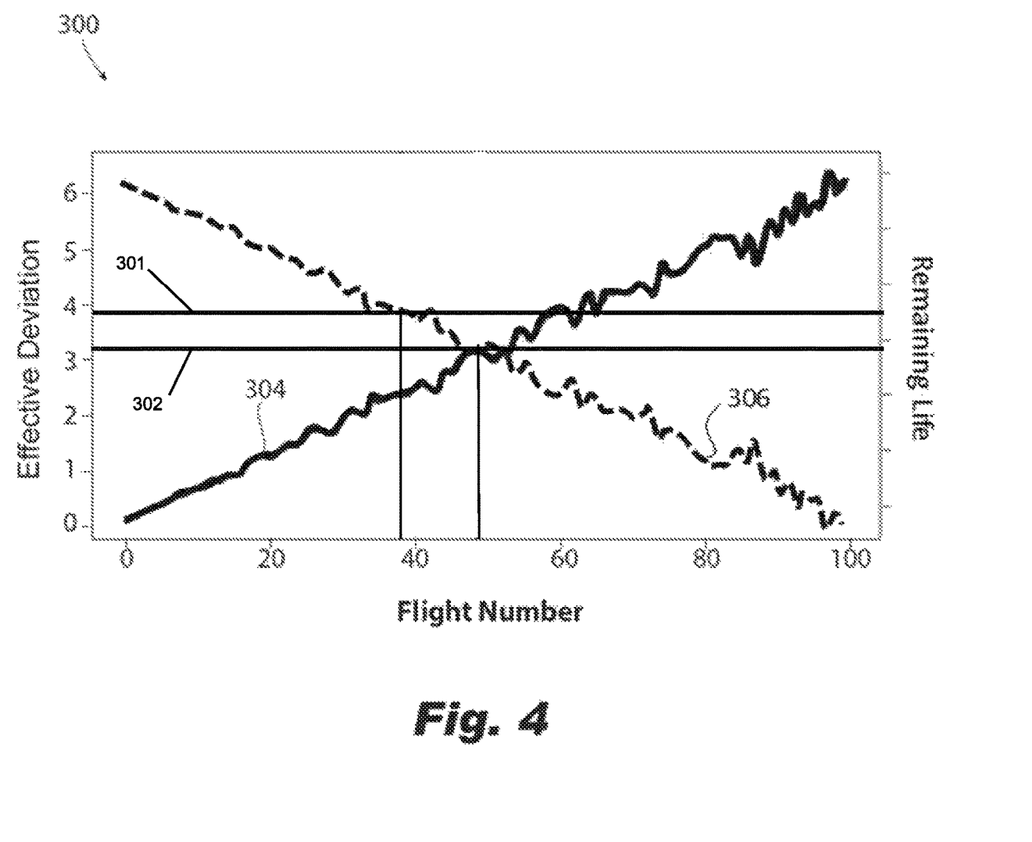
FIG. 4 is a chart depicting an example of an effective deviation and remaining useful life trends for an IDG in accordance with embodiments of the present disclosure, showing a comparison of the effective deviation and remaining useful life to a plurality of thresholds.
Figure 7:
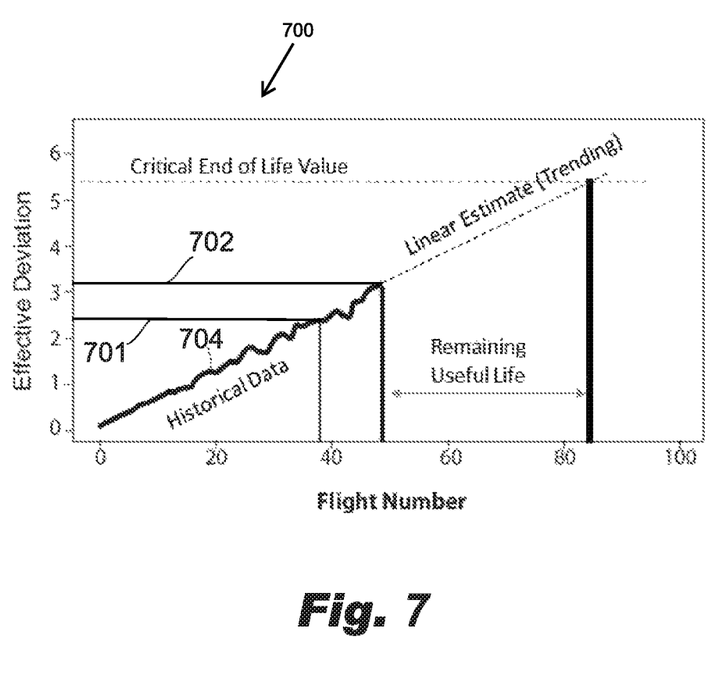
FIG. 7 is a chart depicting an example of the estimation of remaining useful life based on effective deviation.

With reference now to FIGS. 4 and 7, multiple thresholds may be utilized including a low-level warning threshold 301 and/or a higher level warning threshold 302 (e.g. an alert threshold). The chart 300 shows degradation over time using effective frequency deviation as a measure of health. The RUL prediction 306 is proportional to the inverse of the effective deviation 304. As shown in FIG. 7, chart 700 shows how the estimation of remaining useful life can be based on effective deviation. Chart 700 is similar to chart 300 in that it shows effective deviation thresholds 701 and 702 which correspond to RUL thresholds 301 and 302. The thresholds 701 and 702 are met at the same flight number as the RUL thresholds 301 and 302, as indicated by the vertical lines extending from the "Flight Number" axis. In this case, if effective deviation 704 is equal to or above a given one of thresholds 701 or 702, various warnings can be triggered. As shown in FIG. 4, if the near-term RUL prediction 306 of the IDG is equal to or less than a first warning threshold, e.g. threshold 301, the CPU 106 generates an IDG health assessment that is a first warning. If the near-term RUL prediction of the IDG is equal to or less than the second threshold, e.g. the alert threshold 302, the CPU generates a second IDG health assessment, e.g. an alert, which can considered more serious than a warning. In other words, the less of a duration left on the near-term RUL prediction, the closer the IDG is to a fully degraded condition, e.g. and would require an alert. These thresholds can demarcate discrete health states, and can be associated with specific maintenance recommendations such as repair, replacement, and/or stocking parts for at least one of repair or replacement.

Figure 5:
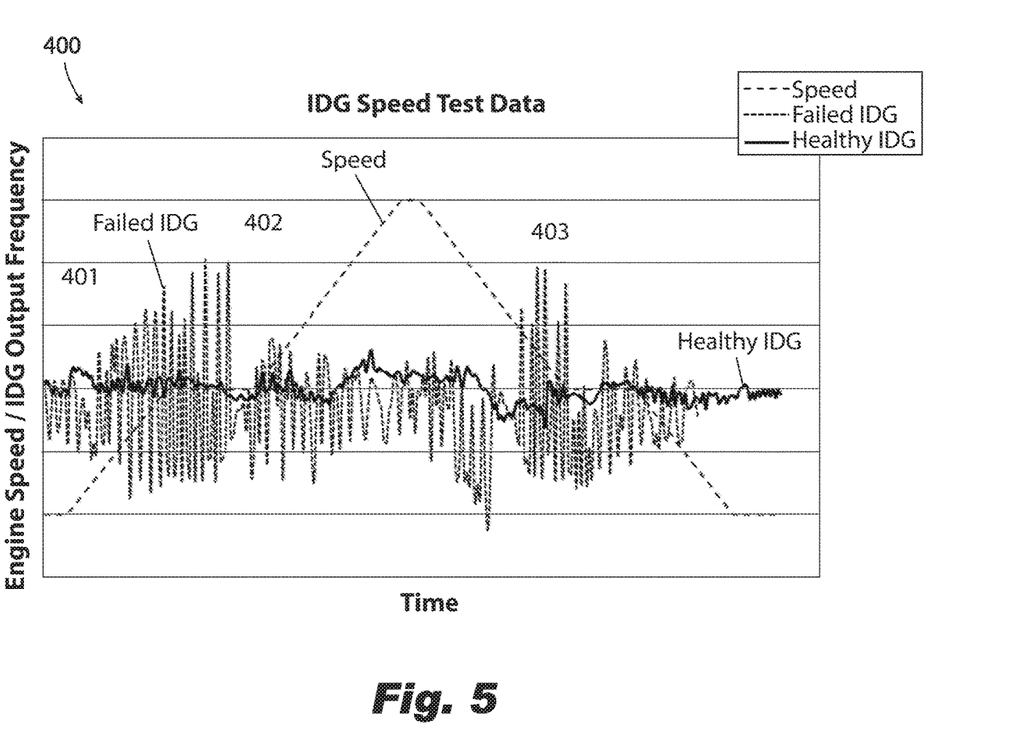
FIG. 5 is a chart depicting an example of the difference between the IDG output frequency for a healthy IDG and a failed IDG.

The systems and methods described herein can be used to determine an effective deviation that is indicative of the current amount of fixed block degradation for an IDG on an air vehicle, e.g. a fixed-wing aircraft. This effective deviation tends to predict if and when IDG degraded performance is expected and can be correlated to a given near-term RUL prediction. The "fixed block" is a component of the IDG that, in conjunction with the variable block, act to regulate the speed output of the IDG. Fixed block degradation tends to cause frequency modulation (which tends to result in electrical anomalies, such as flickering lights). As shown in FIG. 5, chart 400 shows the IDG output frequency for a healthy IDG 401 and for a degraded IDG 402 across a given engine output speed 403. The frequency modulation for degraded IDG 402 is evident by the large peaks and valleys over time. By predicting when degraded performance is expected in accordance with the systems and methods described herein, guidance can be provided to customers to enable them to schedule maintenance and/or removal to avoid delayed or cancelled flights due to unexpected degradation. Additionally, by having this insight, maintenance facilities will be able to ensure that enough replacement parts and units are on-hand when they are needed.

With continued reference to FIG. 1, the system 100 includes a historical database 108 configured and adapted to store the effective deviation over time for a given IDG. The CPU includes an input 110 configured and adapted to receive engine speed data. The CPU includes an output 112 configured and adapted to send the IDG near-term RUL prediction and trigger a maintenance action, if needed. The maintenance action includes at least one of repair, replacement, or stocking parts for at least one of repair or replacement.

With reference now to FIG. 4, chart 300 depicts an example of an effective deviation trend 304 for an IDG, e.g. IDG 102. The effective deviation trend 304 of the output frequency is shown at the straight-through speed (STS) over time (with a trend estimation algorithm applied thereto). The trend 304 is generated through, e.g., a linear regression on the effective deviation data acquired for a given operational period and the historical data for the given IDG. This linear model is used to predict the number of flights expected for the effective deviation to reach a threshold, e.g. the warning and/or alert threshold, or other threshold potentially indicating positive health. If the number of flights left is within a certain range (e.g. under a warning threshold), a maintenance message is given. If the number of flights left is within a certain, smaller, range (e.g. under an alert threshold), a second maintenance message is given.

Those skilled in the art will readily appreciate that the effective deviation numbers used for the comparison described below can be scaled down, e.g. to a given percentage, e.g. 86% of their full values. Chart 300 (FIG. 4) shows the effective deviation trace 304 over a given number of flights. By correlating the effective deviation 304 to a near-term RUL prediction 306, the RUL 306 can then be compared to a given threshold (e.g. 301 and/or 302) and method 200 can predict when the fixed block wear will cause electrical anomalies on the aircraft (e.g. flickering lights). RUL 306 (labeled "remaining life" in FIG. 4) can mean time until next expected service, or other time prediction. Threshold 301 triggers an output of a warning, e.g. by the sending of a warning signal or other output to a customer, to indicate that degradation, e.g. failure, is expected and maintenance should be scheduled. This can also include ensuring that the proper parts are available for maintenance. As such, the customer, e.g. an airline, can predict when failure will occur and have maintenance actions ready to be executed. The threshold 302 is a more severe alert threshold. If the "alert" threshold 302 is met, IDG failure may be imminent and the associated maintenance request may be more urgent. Those skilled in the art will readily appreciate that, in some embodiments, only one of the thresholds may be used, or additional thresholds and associated warnings may be used.

Figure 2:
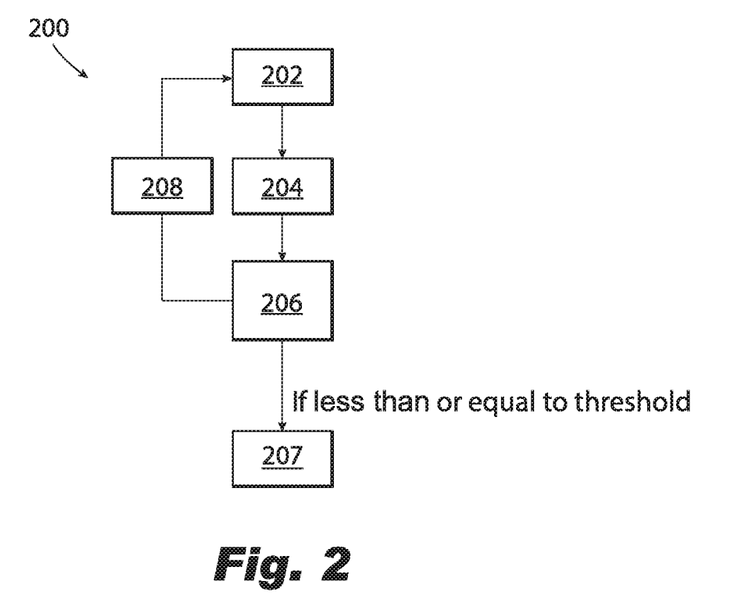
FIG. 2 is flow chart schematically depicting a method for predicting a health status of an IDG in accordance with an embodiment of the present disclosure.

As shown in FIG. 2, a block diagram shows a method 200 of predicting a health status of an integrated drive generator (IDG), e.g. an IDG 102, includes determining an effective deviation across at least some of a plurality of IDG output frequencies for a given IDG operation period, as indicated schematically by box 202. The method includes correlating the effective deviation to an IDG capability to determine a health of the IDG, as indicated schematically by box 204. The IDG capability is a near-term RUL prediction. The method includes comparing the near-term RUL prediction to at least one threshold, as indicated by box 206. The at least one threshold includes at least one of a first warning threshold, e.g. warning threshold 301, or a more severe warning threshold, e.g. alert threshold 302.

The method includes outputting at least one or a series of increasingly severe health warnings and associated RUL predictions depending on which of the corresponding thresholds have been met, as indicated schematically by box 207. In some embodiments, even if a threshold is triggered after generating an effective deviation for a given flight or operation period, the method can include returning to the beginning of the process, e.g. determining another effective deviation, after the next flight, indicated schematically by the box 202. Outputting the health warnings and/or the associated RUL predictions includes scheduling an IDG maintenance action, as indicated schematically by box 207. The maintenance action includes repair, replacement, and/or stocking parts for repair and/or replacement.

The method 200 includes adding the effective deviation to a historical database, e.g. historical database 108, as indicated schematically by box 208. Adding the effective deviation to the historical database can be done when the near-term RUL prediction is greater or equal to at least one of the thresholds, or even if it is less than one of the thresholds. The feature used to determine the degree of modulation present is the effective deviation of the IDG output frequency. As such, the effective deviation calculation will give an indication of the current amount of fixed block degradation. In accordance with embodiments of the present invention, the effective deviation for any particular flight/period of operation from the IDG is calculated using the method of FIG. 3.

Figure 3:
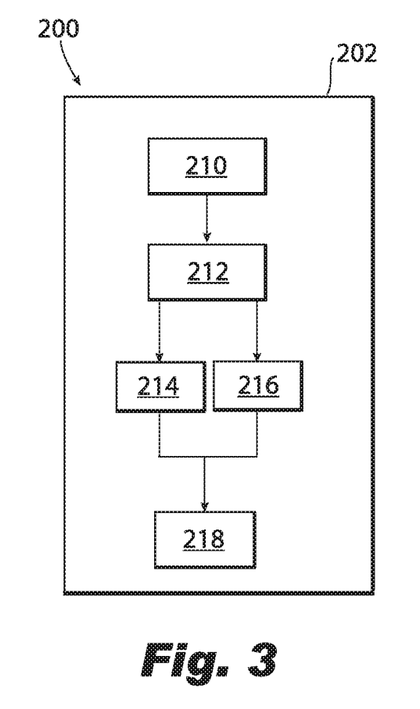
FIG. 3 is flow chart schematically depicting a portion of the method of FIG. 2, showing outputting a health assessment if the near-term RUL prediction is equal to or less than a threshold.

As shown in FIG. 3, a block diagram shows a portion of method 200 for determining the effective deviation, indicated schematically by the box 202. The effective deviation can be determined by at least one of an effective standard deviation calculation (equation 2) or a statistical percentile calculation (equation 3). Under either scenario, determining the effective deviation includes determining a modified mean output frequency for the given IDG operation period across a plurality of select output frequencies of the given set of output frequencies, as indicated schematically by box 210. The select output frequencies are those outside of a tolerance about the STS of the IDG. The tolerance about the IDG's STS is presented in terms of engine core speed, since the engine core is coupled to the IDG via a gearbox. The tolerance in STS is equal to the gear-ratio converted engine core rpm range representative of +/−5% of the maximum operating engine core speed. The modified mean frequency for the given flight/operational period is calculated following IDG startup, and during a stable condition where input speeds and loads are not excessively variant. Determining the effective deviation includes isolating the IDG output frequencies when a respective IDG speed is within the tolerance about a STS of an IDG to generate a plurality of isolated output frequencies, as indicated schematically by box 212. In some embodiments, isolating the IDG output frequencies can include isolating the IDG frequencies where the engine speed is within the tolerance defined above.

There are multiple methods of determining the effective deviation for purposes of method 200. The methods mentioned here involve determining a modified mean, $\overline{f_{nst}}$, (equation 1, below). Consider time series frequency measurements (f) for a given flight cycle. The frequency at which the particular IDG nominally operates is computed first:

$$\overline{f_{nst}} = \frac{\sum_{j=1}^{M} f_{nst,j}}{M}, \tag{1}$$

where $f_{nst,j}$ is the IDG output frequency (in Hz) at the $j^{th}$ time sample. This is averaged over M time samples during the flight when the frequency is not within the tolerance about a STS of the IDG, but still at a stable, running condition. A stable, running condition is defined as one with stabilized temperatures above idle, and minimal variations in input load and input speed.

In accordance with some embodiments, determining the effective deviation includes determining an effective standard deviation by generating a root mean squared (RMS) value for the delta frequencies, as indicated schematically by box 214. The delta isolated output frequency is a difference between a given one of the isolated output frequencies and the modified mean output frequency. In the effective standard deviation calculation of equation (2), below, all of the isolated frequencies within the tolerance about the STS are considered:

$$\sigma_{\text{eff}} = \sqrt{\frac{\sum_{i=1}^{N}[f_{st,i} - \overline{f_{nst}}]^2}{N}}, \quad (2)$$

where $\sigma_{\text{eff}}$ is the effective standard deviation, a measure of frequency modulation, $f_{st,i}$ is the isolated IDG output frequency when the IDG is operating within the tolerance about STS, with stable load and speed, above idle, at the $i^{th}$ time step. The equation considers all available (N) measurements satisfying the tolerance and stability criteria, where N is the number of isolated IDG output frequencies being considered. As this method approximates an effective standard deviation, IDG frequency modulation severity is proportional to this quantity.

In accordance with some embodiments, determining the effective deviation includes determining an effective statistical percentile deviation, $\delta_{st,i}$, using equation (3), below, as indicated schematically by box 216. Equation (3) uses the isolated measured frequencies within the tolerance about STS ($f_{st}$) and the modified mean frequency for the select output frequencies that are outside of the tolerance about STS, $\overline{f_{nst}}$, as defined above. A series of differences between the $i^{th}$ frequency measured during stable, straight through operation ($f_{st,i}$) from $\overline{f_{nst}}$ can be defined as follows:

$$\delta_{st,i} = |f_{st,i} - \overline{f_{nst}}|, \text{ where} \quad (3)$$

$\delta_{st,i}$ is the difference between the $i^{th}$ time-step measurement of the isolated frequencies when the IDG speed is within tolerance about STS and satisfying speed and load stability criteria, $f_{st,i}$, and the modified mean frequency $\overline{f_{nst}}$ from equation (1), above. The measure of the effective deviation can be the maximum of $\delta_{st,i}$ or some sufficiently large (>$80^{th}$) percentile. The percentile method provides noise rejection benefits.

Figure 6:
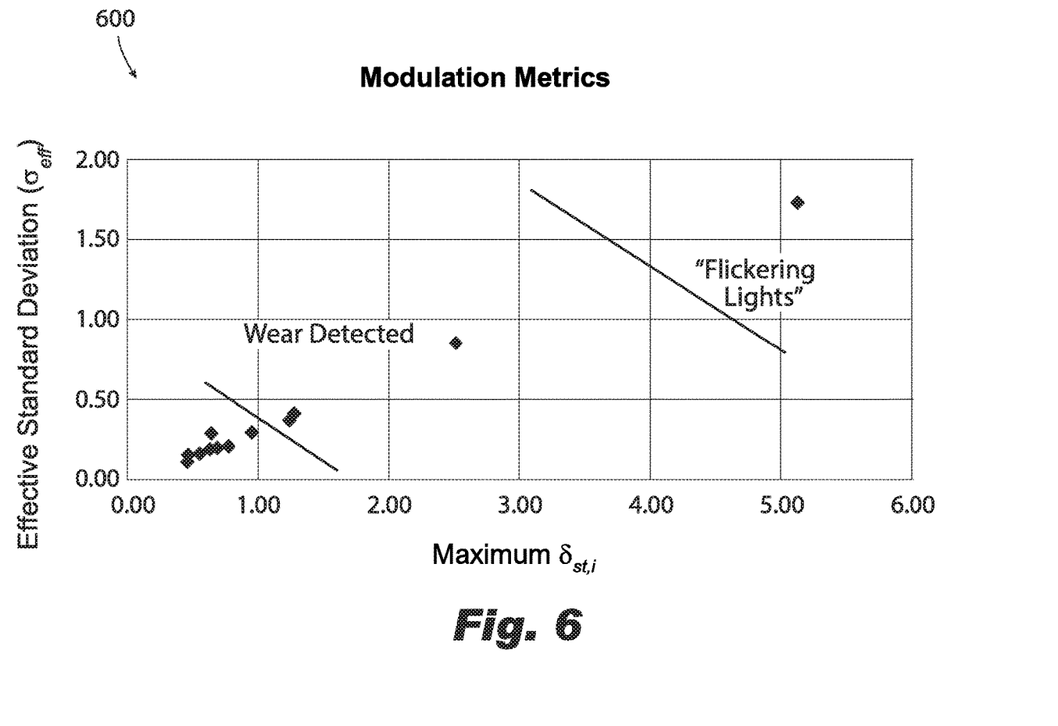
FIG. 6 is a chart depicting an example of how an assessment of an IDG unit can be based on either the effective standard deviation assessment or the effective statistical percentile deviation method, or some combination of both.

While the effective deviation assessments in equations (2) or (3) correlate to some degree, each conveys a separate piece of information. The effective standard deviation method in equation (2) considers the full set of available points while the effective statistical percentile deviation method in equation (3) is an indication only of the extreme points. Hence, each metric can be independently compared with associated thresholds, or combined in a meaningful manner, as shown in FIG. 6 by plot 600. The latter can serve either as an amalgamated health assessment or as a redundancy. FIG. 6 shows how several IDG units, with varying degrees of deterioration, score under both assessment methods and how both methods can be used to segregate the population.

Once the effective deviation for a particular flight is known, the effective deviation can be trended over multiple flights to a near-term RUL prediction, as schematically shown by box 218 in FIG. 3 and graphically in FIG. 7. Trending can be accomplished multiple ways, including linear regression:

$$Y = aX + b$$

$$a = \frac{n\sum_{i=1}^{n} x_i y_i - \sum_{i=1}^{n} x_i \sum_{i=1}^{n} y_i}{n\sum_{i=1}^{n} x_i^2 - \left(\sum_{i=1}^{n} x_i\right)^2}$$

-continued $$b = \frac{1}{n}\left(\sum_{i=1}^{n} y_i - a\sum_{i=1}^{n} x_i\right)$$

This well-known equation can be used as follows. The effective deviation Y trends upward over component life (X) as the IDG deteriorates. The life X may be measured in days, flights, or flight hours. The historical measured effective frequency deviations, $y_i$, and associated times, $x_i$, can be used to construct a linear model with an estimated effective deviation Y at a prediction time X. Applying this technique in more specifics, the RUL in terms of remaining flights or flight hours or days is estimated as $X_{crit} - x_n$, where $X_{crit}$ is the flight number or flight hours or days associated with $Y = Y_{crit}$, the critical effective deviation marking the end of life, and $x_n$ is the current flight number or flight hour or day. Those skilled in the art will readily appreciate that linear regression is not the only method of trending and that there are a variety of other suitable methods for numerical estimation that can be used to trend the effective deviations over time.

Aspects of the present disclosure are described above with reference to block diagrams of methods, apparatus (systems) and computer program products according to embodiments of the disclosure. Features of the methods described include operations, such as equations, transformations, conversions, etc., that can be performed using software, hardware, and/or firmware. Regarding software implementations, it will be understood that individual blocks of the block diagram illustrations and combinations of blocks in the block diagram illustrations, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block diagram block or blocks.

Computing system 106 is only one example of a suitable system and is not intended to suggest any limitation as to the scope of use or functionality of embodiments of the disclosure described herein. Computing system 106 can be implemented using hardware, software, and/or firmware. Regardless, computing system 106 is capable of being implemented and/or performing functionality as set forth in the disclosure. Computing system 106 is shown in the form of a general-purpose computing device. Computing system 106 can include a processing device, memory, an input/output (I/O), and/or an interface (I/F) that can communicate with an internal component and/or external component.

The methods and systems of the present disclosure, as described above and shown in the drawings, provide systems and methods for predicting the health status of an IDG resulting with superior properties including increased prediction of failure before it occurs, resulting in more reliable maintenance schedules. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A method of predicting a health status of an integrated drive generator (IDG), the method comprising:
determining an effective deviation across a plurality of IDG output frequencies for a given IDG operation period; and
correlating the effective deviation to an IDG capability to determine a health of the IDG, wherein determining the effective deviation includes isolating the IDG output frequencies when a respective IDG speed is within a tolerance about a straight-through speed of the IDG to generate a plurality of isolated output frequencies, wherein determining the effective deviation includes determining a modified mean output frequency for the given IDG operation period across a plurality of select output frequencies of the plurality of output frequencies, and wherein determining the effective deviation includes determining a delta frequency for each isolated output frequency, wherein the delta isolated output frequency is a difference between a given one of the isolated output frequencies and the modified mean output frequency.

2. The method as recited in claim 1, wherein the IDG capability is a near-term remaining useful life (RUL) prediction, wherein the method includes outputting a health assessment if the near-term RUL prediction is equal to or less than a threshold.

3. The method as recited in claim 2, wherein the threshold includes at least one warning threshold, wherein outputting the health assessment includes outputting at least one warning if the near-term RUL prediction is equal to or less than the at least one warning threshold.

4. The method as recited in claim 2, wherein the threshold includes a series of multiple warning thresholds, wherein outputting the health assessment includes outputting at least one of a series of warnings if the near-term RUL prediction is equal to or less than one or more of the series of warning thresholds.

5. The method as recited in claim 4, wherein outputting the at least one of the series of warnings includes scheduling an IDG maintenance action.

6. The method as recited in claim 5, wherein the IDG maintenance action includes at least one of repair, replacement, or stocking parts for at least one of repair or replacement.

7. The method as recited in claim 1, further comprising adding the effective deviation to a historical database for an IDG.

8. The method as recited in claim 1, wherein determining the effective deviation includes determining a modified mean output frequency for the given IDG operation period across a plurality of select output frequencies of the plurality of output frequencies.

9. The method as recited in claim 8, wherein the select output frequencies are outside of a tolerance about a straight-through speed of the IDG.

10. The method as recited in claim 1, wherein determining the effective deviation includes determining an effective standard deviation by generating a root mean squared (RMS) value for the delta frequencies.

11. The method as recited in claim 1, wherein determining the effective deviation includes determining an effective statistical percentile deviation and determining a modified mean output frequency for the given IDG operation period across a plurality of select output frequencies of the plurality of output frequencies, wherein the effective statistical percentile deviation is the difference between one of the isolated frequencies at a given percentile and the modified mean output frequency.

12. A system for predicting a health status of an integrated drive generator (IDG), the system comprising:
an IDG;
a generator control unit (GCU) operatively connected to the IDG to determine a plurality of IDG output frequencies for a given IDG operation period; and
a central processing unit (CPU) operatively connected to the GCU to receive the IDG output frequencies therefrom, wherein the CPU is configured and adapted to determine an effective deviation across at least some of the plurality of IDG output frequencies for the given IDG operation period, and correlate the effective deviation to an IDG capability to determine a health of the IDG, wherein determining the effective deviation includes isolating the IDG output frequencies when a respective IDG speed is within a tolerance about a straight-through speed of the IDG to generate a plurality of isolated output frequencies, wherein determining the effective deviation includes determining a modified mean output frequency for the given IDG operation period across a plurality of select output frequencies of the plurality of output frequencies, and wherein determining the effective deviation includes determining a delta frequency for each isolated output frequency, wherein the delta isolated output frequency is a difference between a given one of the isolated output frequencies and the modified mean output frequency.

13. The system as recited in claim 12, wherein the IDG capability is a near-term RUL prediction.

14. The system as recited in claim 13, further comprising a historical database configured and adapted to store the effective deviation.

15. The system as recited in claim 12, wherein the CPU includes an input configured and adapted to receive engine speed data.

16. The system as recited in claim 12, wherein the CPU includes an output configured and adapted to send a near-term RUL prediction as a health assessment output and trigger a maintenance action.

17. The system as recited in claim 16, wherein the maintenance action includes at least one of repair, replacement, or stocking parts for at least one of repair or replacement.

* * * * *